United States Patent [19]

Inada et al.

[11] 4,130,267

[45] Dec. 19, 1978

[54] PNEUMATIC CONTROL SYSTEM AND PRESSURE RESPONSIVE VALVE ASSEMBLY THEREFOR

[75] Inventors: Masami Inada; Kazuhiko Kitamura, both of Kariya, Japan

[73] Assignee: Aisin Seiki Kabushiki Kaisha, Kariya, Japan

[21] Appl. No.: 772,201

[22] Filed: Feb. 25, 1977

Related U.S. Application Data

[62] Division of Ser. No. 611,960, Sep. 10, 1975, Pat. No. 4,044,732.

[30] Foreign Application Priority Data

Sep. 20, 1974 [JP] Japan ........................ 49-108971
Nov. 7, 1974 [JP] Japan ........................ 49-128403

[51] Int. Cl. ........................ F16k 31/128

[52] U.S. Cl. ........................ 251/61.2; 123/124 R; 137/510; 251/61.5; 251/85

[58] Field of Search ............ 123/97 B, 124 R, 117 A, 123/119 D; 137/510; 60/278; 251/61.2, 61.3, 61.4, 61.5, 85, 46; 261/121 B

[56] References Cited

U.S. PATENT DOCUMENTS

| | | | |
|---|---|---|---|
| 2,070,411 | 2/1937 | Powers | 137/510 |
| 2,074,292 | 3/1937 | Wilkins | 137/510 |
| 2,229,821 | 1/1941 | Seymour | 123/117 A |
| 3,048,361 | 8/1962 | Francis | 251/61.2 |
| 3,081,793 | 3/1963 | Flatt et al. | 123/117 A |
| 3,084,901 | 4/1963 | Thorburn | 251/61.4 |
| 3,219,310 | 11/1965 | Baumann | 251/61.5 |
| 3,241,805 | 3/1966 | Schumann | 251/61.4 |
| 3,461,913 | 8/1969 | Scott | 251/61.5 |
| 4,010,723 | 3/1977 | Suziki et al. | 261/121 B |

FOREIGN PATENT DOCUMENTS

| | | | |
|---|---|---|---|
| 583510 | 9/1959 | Canada | 251/61.5 |

*Primary Examiner*—Martin P. Schwadron
*Assistant Examiner*—G. L. Walton
*Attorney, Agent, or Firm*—Sughrue, Rothwell, Mion, Zinn and Macpeak

[57] ABSTRACT

A pneumatic pressure responsive valve assembly for a pneumatic control system in a vehicle includes a power piston movable due to the pneumatic pressure difference between atmospheric pressure and a signaling vacuum pressure, which piston comprises a valve member cooperable with a valve seat. The valve member is slidably mounted with respect to the power piston. A weak spring disposed between the valve member and the power piston normally seats the valve member on the valve seat and movement of the power piston will unseat the valve member to provide a pneumatic control function.

6 Claims, 3 Drawing Figures

PNEUMATIC CONTROL SYSTEM AND PRESSURE RESPONSIVE VALVE ASSEMBLY THEREFOR

This is a division of application Ser. No. 611,960, filed Sept. 10, 1975, now U.S. Pat. No. 4,044,732.

BACKGROUND OF THE INVENTION

The present invention relates to a pneumatic control system as well as to a pressure responsive valve assembly for such a control system. More particularly, the present invention relates to a pneumatic pressure responsive valve assembly adapted for use in a pneumatically operated system for reducing certain exhaust gas elements of an engine operated vehicle.

As is known, the spark timing of the engine is advanced proportionally to an engine load by utilizing the vacuum which is generated at the advance port of the carburetor and the advance is increased in proportion to the engine load. Means for accomplishing such an effect comprises a valve assembly which renders ineffective the operation of the spark-timing advancing device until the engine load is increased a predetermined amount, thereby minimizing the emission of harmful gas elements such as $NO_x$.

The problem with the conventional means is that the rubber valve member of the valve assembly is likely to adhere to the valve seat particularly when the engine temperature is relatively high, thereby resulting in retarded operation or non-operation of the valve member. Thus, it is difficult for the conventional means to achieve the primary object of reducing the objectionable exhaust gas elements.

SUMMARY OF THE INVENTION

It is, therefore, one of the objects of the invention to provide a pressure responsive valve assembly wherein the valve member is lightly biased against the valve seat even when the valve assembly is used for a relatively long time at high engine temperatures.

It is another object of the invention to provide a pressure responsive valve assembly the operation of which is reliable and quick in response.

It is a further object of the invention to provide a pneumatic control system which utilizes such a pressure responsive valve assembly.

DETAILED DESCRIPTION OF THE PREFERRED EMBODIMENTS

Figure 1:
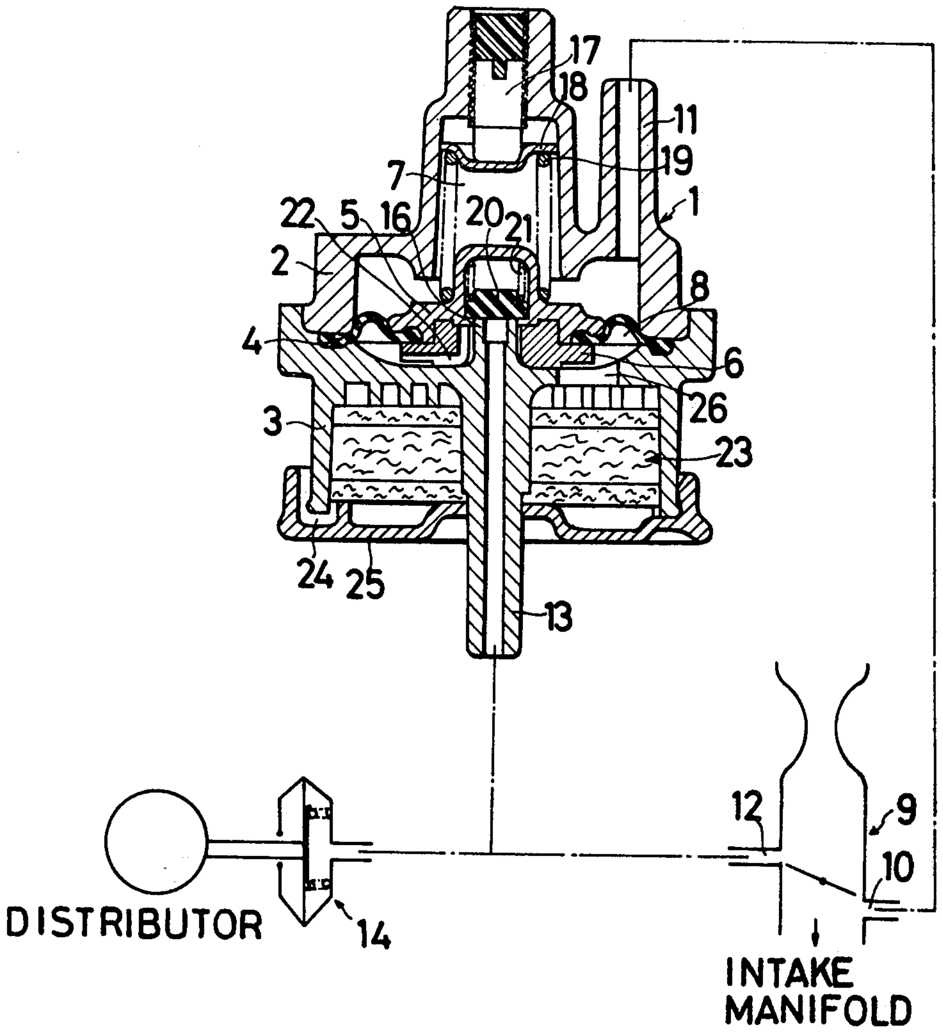
FIG. 1 is a cross-sectional view of a pressure responsive valve assembly utilized in a pneumatic control system which is schematically shown.

Referring now to the drawings, especially FIG. 1 thereof, whereon one embodiment of the invention is illustrated, a pressure responsive valve assembly 1 includes an upper housing 2 and a lower housing 3 secured to each other by suitable securing means such as supersonic wave bonding. The outer periphery of a diaphragm 4 is fitted in an airtight manner between the housings 2 and 3. Within the housings 2 and 3 is movably disposed a generally disc-shaped power piston 5 to which a guide member 6 is fixed at its lower portion. The inner periphery of the diaphragm 4 is fitted in an airtight manner between the power piston 5 and the guide member 6. Thus, the interior of the valve assembly 1 is divided into an upper chamber 7 and a lower chamber 8 pneumatically independent of each other. The upper housing 2 is provided with a port 11 for pneumatically communicating the upper chamber 7 with the intake manifold vacuum inlet 10 of a carburetor 9, while the lower housing 3 is provided with a port 13 for pneumatically communicating the lower chamber 8 with a pneumatically operated device 14 for advancing the engine spark timing. The advancing device 14 is also pneumatically communicated with an advancing port 12 of the carburetor 9.

An inner edge 16 of the port 13 is formed as valve seat. A screw-threaded bolt 17 is attached to the top opening of the upper housing 2 and a spring retainer 18 is attached to the lower end of bolt 17. Between the retainer 18 and the power piston 5 is interposed a first spring 19 which is strong enough to normally urge the guide member 6 into contact with the inner wall of lower housing 3 as shown in FIG. 1. Within the recess of the power piston 5 is mounted a rubber valve member 20 which is movable with respect to the power piston 5. The valve member 20 is seated on the valve seat 16 of port 13 of the lower housing 3 by the force of a second spring 21 which is interposed between the power piston 5 and the valve member 20. It is to be noted that the biasing force of the second spring 21 is weaker than that of the first spring 19.

An air filter assembly 23 is securely fitted in a recess in the lower housing 3 about the port 13 and includes three elements the intermediate one of which is made of felt and two of which are made of foamed polyester material. A filter cap 25 is detachably fitted to the lower housing 3 for providing an air passage 24 therebetween.

The inside wall of the lower housing 3 is provided with a through hole 26 through which the atmospheric air may be admitted to the lower chamber 8 through the air filter 23. The guide member 6 is also provided with an air passage 22 so that the atmospheric air is normally applied to the lower edge of valve member 20.

In operation, when the engine load is relatively low to generate a relatively high vacuum at the vacuum inlet 10 of the carburetor 9, the vacuum is applied to the upper chamber 7 of the pressure responsive valve assembly 1 through the port 11 thereof. The diaphragm 4 together with the power piston 5 and the guide member 6 is moved upward due to the pressure difference between the upper and lower chambers 7 and 8 since the lower chamber 8 is normally supplied with air at atmospheric pressure. Therefore, the valve member 20 is also moved up due to engagement with the guide member 6 so as to release from the valve seat 16. As a result, the atmospheric air in the lower chamber 8 is admitted to the advancing device 14 via port 13 so that the advancing operation of the device 14 is not actuated. Such a non-actuation of the advancing device 14 results in lowering of the explosion pressure of the engine. Consequently, the average temperature of the interior of the engine is lowered so as to minimize the emission of $NO_x$ contained in the exhaust gas elements.

When the engine load is relatively high, the vacuum at the inlet 10 of carburetor 9 is decreased to apply a relatively low vacuum to the upper chamber 7. It should be recognized that the biasing force of the first spring 19 is stronger than the now acting force caused by the pressure difference between the upper and the lower chambers 7 and 8. Thus, the power piston 5, the diaphragm 4, and the guide member 6 are not moved and the valve member 20 remains seated on the valve seat 16. The vacuum from the advance port 12 is, thereof, applied to the advancing device to actuate the advancing operation thereof.

Figure 2:
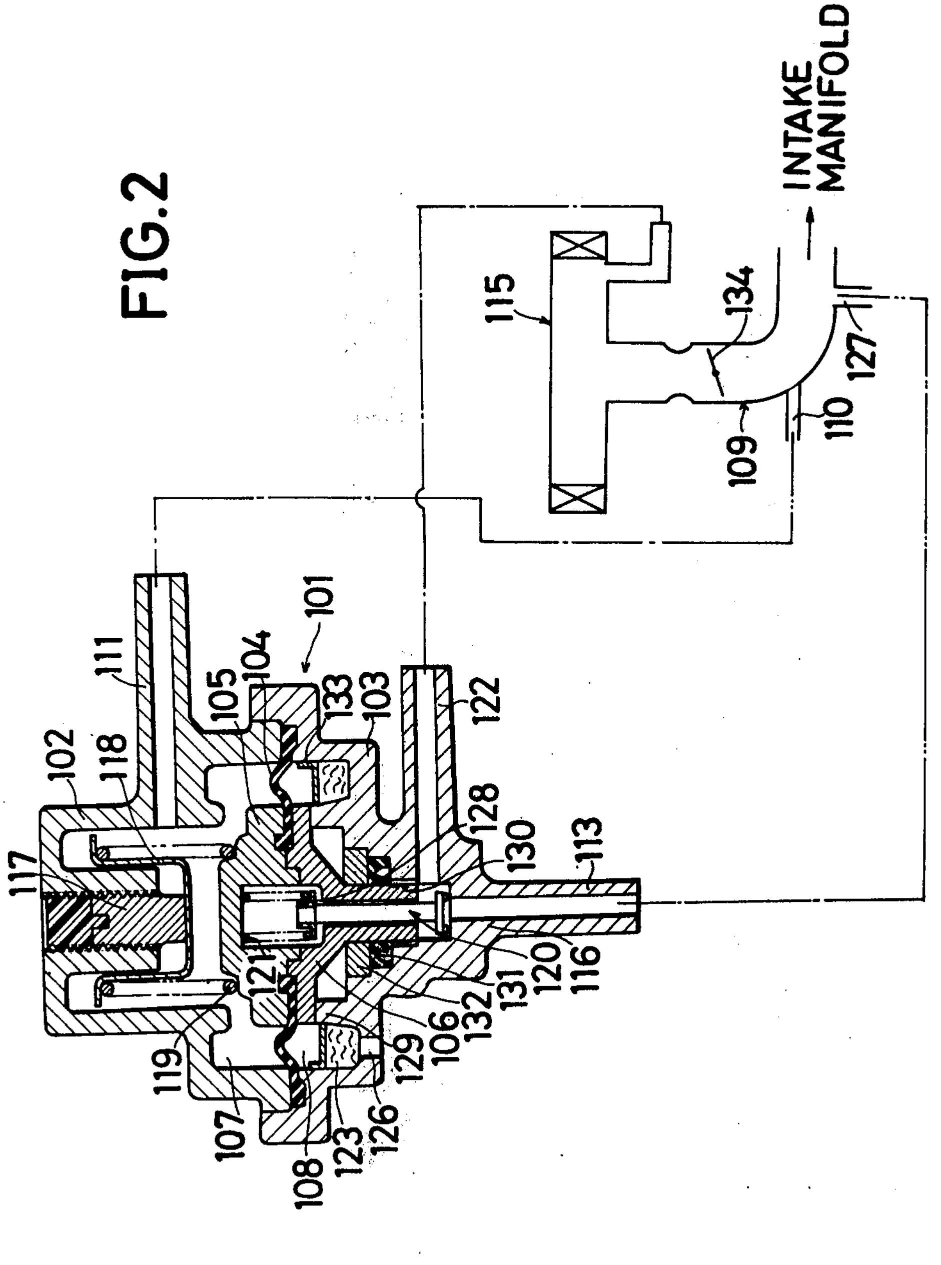
FIG. 2 is a view similar to FIG. 1, but showing a modified embodiment of the invention.

Referring now to FIG. 2 wherein a modified embodiment of the invention is shown, a pressure responsive valve assembly 101 includes a housing 102 securely fitted to a housing 103, and a diaphragm 104 the outer periphery of which is fitted in an airtight manner between the housings 102 and 103 and the inner periphery of which is fitted in an airtight manner between a power piston 105 and the guide member 106. The interior of the valve assembly 101 is divided into an upper chamber 107 and a lower chamber 108 by the diaphragm 104, the power piston 105, and the guide member 106. The power piston 105 and the guide member 106 are secured to each other by suitable securing means such as supersonic wave bonding. The upper housing 102 is provided with a port 111 through which the upper chamber 107 is pneumatically communicated with a first vacuum manifold inlet 110 of a carburetor 109. The lower housing 103 is provided with a port 122 pneumatically communicated with the air filter 115 on the carburetor 105 and a port 113 pneumatically communicated with a second vacuum manifold inlet 127. An inner edge 116 of the port 113 is formed as valve seat which is engageable with a valve member 120 to thereby control the pneumatic communication between the ports 122 and 113. The valve member 120 is movable within the tubular projection of the guide member 106 and the tip end thereof is engaged with a spring retainer 128.

A first spring 119 is interposed between the power piston 105 and a retainer 118 attached to a screw-threaded bolt 117. A second spring 121 is interposed between the power piston 105 and the spring retainer 128. The exerting force of the first spring 119 is stronger than that of the second spring 121 so that the guide member 106 is normally biased against a shoulder 129 of the lower housing 103, as shown. Thus, the valve member 120 is seated on the valve seat 116, while the guide member 106 is spaced from the spring retainer 128. The tubular portion of the guide member 106 is slidably fitted within a bore 130 of the lower housing 103 to thereby guide the movement of the power piston 105. A seal cup 131 provided between the guide member 106 and the lower housing 103 is prevented from the withdrawal by a retainer 132 fixed to the housing 103.

The lower chamber 108 is normally supplied with air at atmospheric pressure via an inlet aperture 126 and an air-filter 123 mounted in the lower housing 103. A retainer 133 is provided for the air-filter 123.

In operation, a throttle valve 134 of the carburetor 9 is suddenly closed upon deceleration of the vehicle so that the vacuum generated at the first inlet 110 to be applied at the upper chamber 107 of the valve assembly 101 increases. The diaphragm 104 together with the power piston 105 and the guide member 106 is moved upward due to the pressure difference between the upper and the lower chambers 107 and 108 against the exerting force of the first spring 119 so as to engage the guide member 106 with the retainer 128 and to release the valve member 120 from the valve seat 116. Therefore, air at atmospheric pressure is supplied to the port 113 through the air-filter 115 and the port 122 of valve assembly 103, and then to the intake manifold through the second inlet 127 of the carburetor 109. The fuel mixture to be supplied to the engine is prevented from being excessively rich even when the air flow quantity supplied via throttle valve 134 is small, to thereby minimize the emission of HC contained in the exhaust gas elements.

During the usual running of the vehicle, the diaphragm 104, the power piston 105, and the guide member 106 are disposed in the illustrated position by the first spring 119 since the pressure difference generated is not enough to overcome the first spring 119. Thus, the valve member 120 is seated on the valve seat 116 by the second spring 121 so that no atmospheric air is supplied through the second inlet 127 thereby preventing the fuel mixture from being excessively lean.

Figure 3:
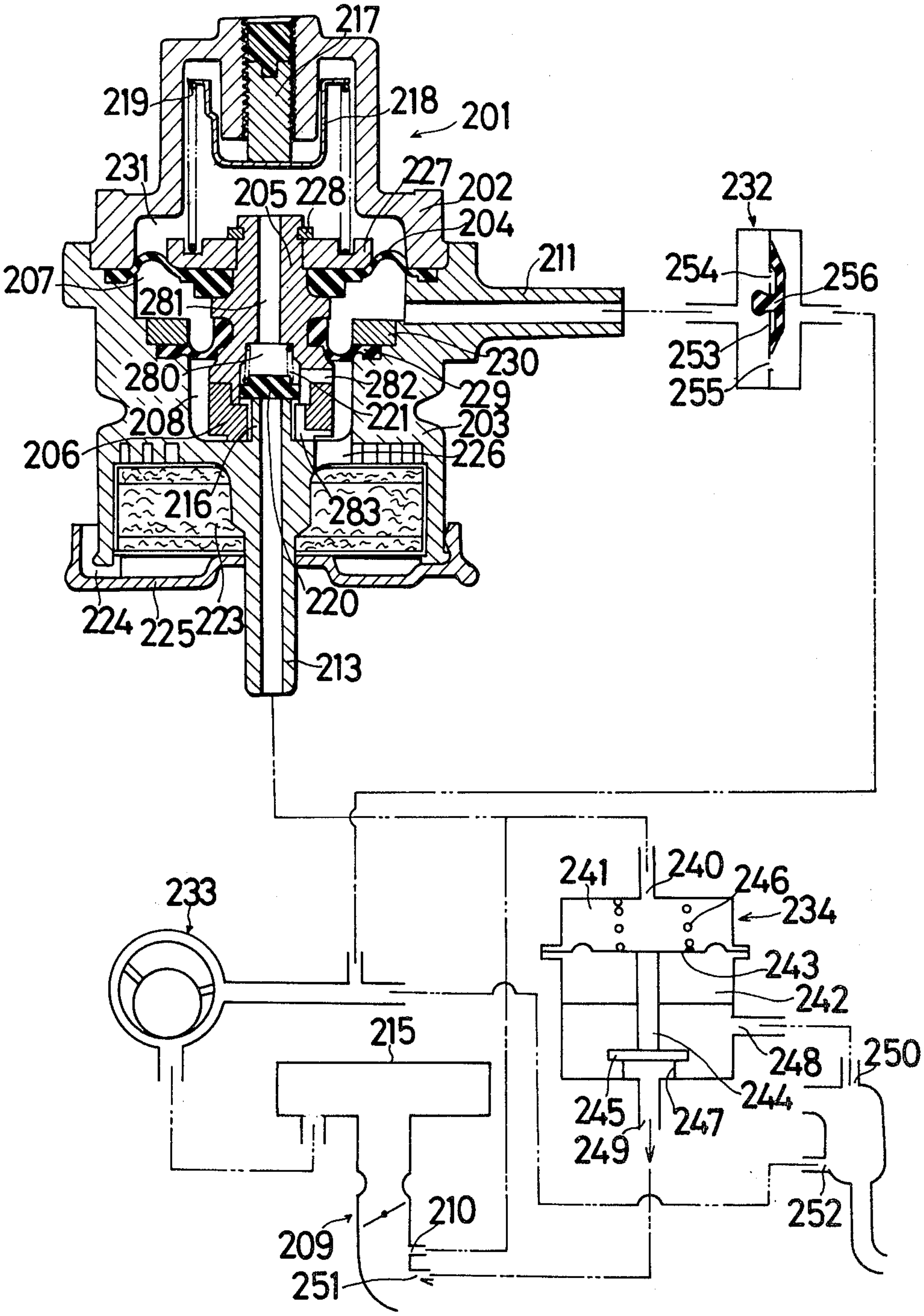
FIG. 3 is a view similar to FIG. 2, but showing another modification of the invention.

Referring to FIG. 3, another modification of the invention is shown. A pressure responsive valve assembly 201 includes an upper housing 202 and a lower housing 203 secured together by suitable means. Between the housings 202 and 203 is fixedly disposed the outer periphery of a first diaphragm 204. The inner periphery of the first diaphragm 204 is fixed in an airtight manner between a power piston 205 and a retainer 227 which is secured to the power piston 205 by means of a snap ring 228. A second diaphragm 229, disposed below the first diaphragm 204 and of a smaller diameter than the first diaphragm 204, is fixed between the housing 203 and a retainer 230 at its outer periphery while the inner periphery is fixed to an annular groove in the power piston 205. The retainer 230 is fixed to the housing 203 by means of supersonic wave bonding. The interior defined by the upper and lower housings 202 and 203 is divided into a first chamber 207, a second chamber 208, and a third chamber 231. A recess 280 is provided at the lower end of the power piston 205 in which is located the valve seat 216 of a port 213 made integrally with the lower housing 203. A rubber valve member 220 contained within the recess 280 is movable relative to the power piston 205 and is seated on the valve seat 216 by a weak spring 221. A guide member 206 is secured to the lower end of the power piston 205 for guiding the movement of the power piston 205. When the guide member 206 is contacted with the lower housing 203 as shown, the top face of the guide member 206 is spaced from the valve member 220. When the power piston 205 is moved upward the valve member 220 is engaged with the top face of the guide member 206 to thereby release the valve member 220 from the valve seat 216. A strong spring 219 for urging the power piston 205 downward is disposed between the retainer 227 and a spring retainer 218 which is engaged with a screw bolt 217 screw-threaded to the upper housing 202. The first chamber 207 defined by the first and the second diaphragms 204 and 229 is pneumatically communicated with a retarding valve 232 through a port 211 in the lower housing 203. The retarding valve 232 is communicated with the outlet of an air pump 233. The second chamber 208 is communicated with the atmospheric air through a hole 226 in the lower housing 203, an air-filter 223, and a passage 224 provided between the housing 203 and a bottom cap 225. The third chamber 231 is pneumatically communicated with the second chamber 208 through a central passage 281 of the power piston 205, the recess 280, and a lateral slot 282. The guide member 206 is provided with a groove 283 through which the atmospheric pressure in the second chamber 208 is supplied around the valve seat 216.

The port 213 of the lower housing 203 is pneumatically communicated with a port 240 of a valve 234 which is also communicated with a intake manifold vacuum port 210 of a carburetor 209. The valve 234 includes chambers 241 and 242 divided by a power piston 243. The chamber 241 is communicated with the port 240 while the chamber 242 is communicated with the atmospheric air. The power piston 243 is connected to a rod 244 to which a valve member 245 is fixed. When the vacuum in the chamber 241 is low the power piston 243 is moved down by a spring 246 to thereby seat the valve member 245 on a valve seat 247. When the valve member 245 is released from the valve seat 247, ports 248 and 249 are communicated with each other. The port 248 is communicated with an exhaust manifold port 250 while the port 249 is communicated with a second intake manifold vacuum port 251. The inlet of the air pump 233, driven by an engine (not shown), is connected to an air-filter 215 while the outlet thereof is connected to a second exhaust manifold port 252.

The retarding valve 232 comprises a partition member 253 provided with orifices 254 and 255. A one-way check valve 256 is provided to close the orifice 254 which may be opened only when the atmospheric air is passed to the outlet of air pump 233 from the pressure responsive valve assembly 201.

In operation, when the engine load of the vehicle is low such as in the stopped condition of the vehicle or in usual deceleration thereof, a high vacuum is generated at the vacuum inlet 210 of carburetor 209 and the exhausting volume of the air pump 233 is decreased to thereby decrease the pneumatic pressure. Each element of the valve assembly 201 is kept in the illustrated position since the first chamber 207 is communicated with the outlet of air pump 233 through the retarding valve 232. Therefore, the chamber 241 of the valve 234 is supplied with high vacuum to move the power piston 243 against the spring 246, thereby releasing the valve member 245 from the valve seat 247. Accordingly, the exhausted gas is admitted to the vacuum port 251 from the exhaust manifold port 250 through the valve 234, so that the exhausted gas will be admitted to the engine. Thus, the operative temperature of the engine is lowered to minimize the emission of $NO_x$ contained in the exhaust gas elements.

When the engine load of the vehicle is great, the pressure of the air pump 233 is admitted to the first chamber 207 of the valve assembly 201 via retarding valve 232 and the power piston 205 is moved upward due to pressure difference between the first and the third chambers 207 and 231 against the exerting force of spring 219. Thus, the guide member 206 is engaged with the valve member 220 to release the valve member 220 from the valve seat 216. The atmospheric air in the second chamber 208 is, therefore, applied to the port 240 of the valve 234 through the port 213, thereby lowering the vacuum pressure in the chamber 241. Consequently, the valve member 245 is seated on the valve seat 247 by the spring 246 so that the admission of the exhaust gas to the port 251 from the exhaust manifold port 250 is prevented.

What is claimed is:

1. A pressure responsive valve assembly for use with a vacuum source, comprising in combination:

a housing including an inlet port adapted to be connected to said vacuum source and an outlet port adapted to be connected to an engine emission control device of a motor vehicle, said housing being comprised of an upper housing and a lower housing, a diaphragm secured between the edges of said upper and lower housing dividing the interior of said housing into a first chamber and a second chamber, said first chamber adapted to be communicable with said vacuum source through said inlet port, while said second chamber is provided with a hole communicating with air at atmospheric pressure, a power piston movably disposed in said housing, a guide member secured to said power piston with the inner peripheral edge of said diaphragm secured between said piston and said guide member, a first spring disposed within said housing for urging said power piston to move in one direction into said second chamber, said power piston being movable in the other direction against the force of said first spring when a vacuum is applied to said first chamber, a valve seat surrounding said outlet port, a valve member operatively associated with said power piston and cooperative with said valve seat to control the admission of atmospheric air to said outlet port from said second chamber, and a second spring disposed between said power piston and said valve member and being weaker than said first spring for urging said valve member to rest on said valve seat when said power piston is being urged in said one direction.

2. A pressure responsive valve assembly as set forth in claim 1, wherein said first spring is disposed in said first chamber.

3. A pressure responsive valve assembly as set forth in claim 1, wherein said power piston is provided with a recess within which said second spring is disposed.

4. A pressure responsive valve assembly as set forth in claim 3 wherein at least a portion of said valve member is disposed in said recess in interferring relation therewith so that upon movement of said power piston in said other direction said valve member will be separated from said valve seat.

5. A pressure responsive valve assembly as set forth in claim 1, further comprising an air filter disposed adjacent said hole to filter the air entering said second chamber.

6. A pressure responsive valve assembly as set forth in claim 1, further comprising an additional diaphragm secured to said housing and said power piston to define a third chamber, passage means normally communicating said third chamber with said second chamber, and said first spring being disposed in said third chamber.

* * * * *